United States Patent [19]

Bedell et al.

[11] Patent Number: 4,960,575

[45] Date of Patent: Oct. 2, 1990

[54] REMOVAL OF HYDROGEN SULFIDE WITH ON SITE GENERATED SULFITE FROM GEOTHERMAL STEAM

[75] Inventors: Stephen A. Bedell; Larry H. Kirby, both of Lake Jackson, Tex.

[73] Assignee: The Dow Chemical Company, Midland, Mich.

[21] Appl. No.: 359,533

[22] Filed: Jun. 1, 1989

[51] Int. Cl.[5] .................... C01B 17/16; C01B 34/20; C01B 17/00; C01B 17/64

[52] U.S. Cl. .................................. 423/222; 210/668; 210/669; 423/234; 423/242; 423/512 A; 423/514; 423/DIG. 19

[58] Field of Search ............... 423/DIG. 19, 222, 242, 423/512 A, 514, 234; 210/668, 669

[56] References Cited

U.S. PATENT DOCUMENTS

| | | | |
|---|---|---|---|
| 3,446,595 | 3/1965 | Guerrieri | 23/225 |
| 3,447,903 | 10/1965 | Wiewiorowski | 23/226 |
| 3,859,414 | 1/1975 | Urban | 423/222 |
| 4,310,438 | 1/1982 | Steelhammer et al. | 252/401 |
| 4,342,733 | 8/1982 | Steelhammer et al. | 423/242 |
| 4,451,442 | 5/1984 | Jeffrey et al. | 423/224 |
| 4,614,644 | 9/1986 | Lampton et al. | 423/DIG. 19 |
| 4,622,212 | 11/1986 | McManus et al. | 423/226 |
| 4,629,608 | 12/1986 | Lampton et al. | 423/266 |
| 4,830,838 | 5/1989 | Kent et al. | 423/226 |

*Primary Examiner*—John Doll
*Assistant Examiner*—Lori F. Cuomo

[57] ABSTRACT

Geothermal steam is condensed with a sulfite solution to abate hydrogen sulfide. A portion of the hydrogen sulfide is converted in the condensation in the presence of soluble cationic polymeric catalysts to soluble sulfur compounds while avoiding elemental sulfur and carbonate formation. The remainder of the hydrogen sulfide is incinerated and the sulfur dioxide in the incinerator effluent is absorbed in an alkaline solution to form the sulfites for the geothermal steam condensation. By maintaining stoichiometric ratios, the hydrogen sulfide is substantially converted to soluble thiosulfate without the use of chelates, peroxides or makeup sulfites.

13 Claims, 1 Drawing Sheet

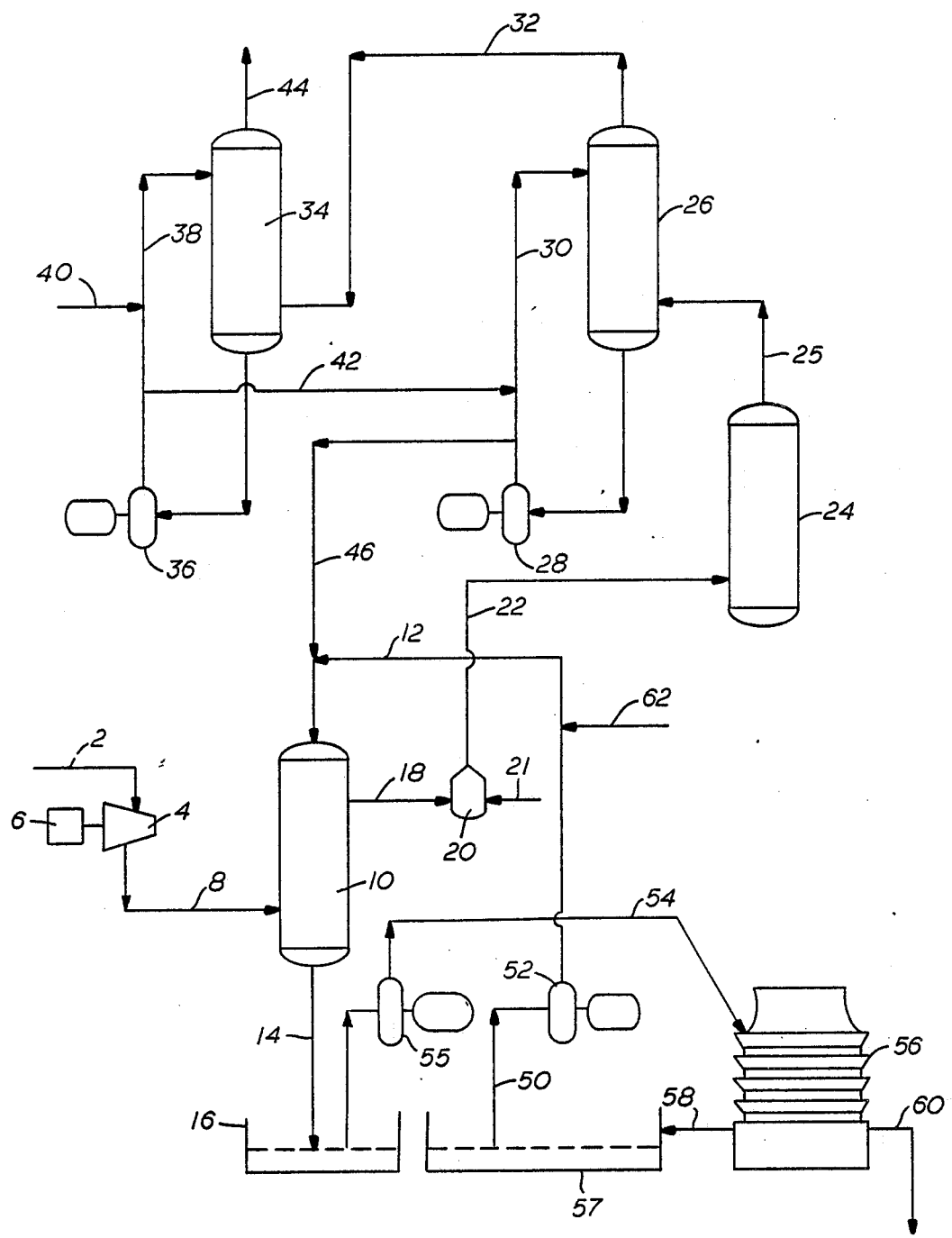

REMOVAL OF HYDROGEN SULFIDE WITH ON SITE GENERATED SULFITE FROM GEOTHERMAL STEAM

FIELD OF THE INVENTION

The present invention relates to the removal of hydrogen sulfide from fluid streams with a minimum production of solids using a sulfite solution for contacting the fluid stream at thiosulfate-forming conditions, and particularly to such a removal wherein the sulfite is generated by combustion of a portion of the hydrogen sulfide-containing fluid stream to form $SO_2$ and absorbing the $SO_2$ in an alkali metal hydroxide solution.

BACKGROUND OF THE INVENTION

It is known from U.S. Pat. No. 4,451,442 to contact fluid streams containing hydrogen sulfide from a steam turbine or from a sour gas stream with an aqueous solution of a polyvalent metal chelate and an oxidizing agent whereby the hydrogen sulfide is converted to free sulfur and then to soluble sulfur compounds, and wherein the metal chelate is reduced to a lower oxidation state metal chelate and the reduced metal chelate is subsequently oxidized with air back to the higher oxidation state and reused.

It is known from U.S. Pat. No. 3,859,414 to remove $H_2S$ from a gas stream containing $H_2S$ and $CO_2$ without essentially affecting the $CO_2$ content of the gas stream by contacting the gas stream, in an absorption zone, with an aqueous absorbent stream containing a water-soluble sulfite compound at thiosulfate production conditions, including a pH selected from the range of about 6 to about 7 and selected to form a treated gas stream substantially reduced in $H_2S$ content and a rich absorbent stream which contains a thiosulfate compound and which is substantially free of elemental sulfur.

It is known from U.S. Pat. No. 3,446,595 to contact hydrogen sulfide with bisulfite to form a mixture of elemental sulfur and sodium sulfite solution, to separate the elemental sulfur from the sulfite solution, and to regenerate the sulfite solution with sulfur dioxide which is obtained by combustion of a portion of the recovered elemental sulfur. This process requires the presence of bisulfite for hydrogen sulfide treatment and sodium hydroxide and sodium carbonate are disclosed as suitable makeup solutions for the contact step.

It is known from U.S. Pat. No. 4,629,608 to use cationic polymeric catalysts in an aqueous metal chelating solution for removing $H_2S$ from the exhaust steam in a geothermal power plant.

The combustion of $H_2S$ and subsequent absorption of the resulting sulfur dioxide in a caustic solution is described in the prior art, for example, in U.S. Pat. Nos. 4,310,438; 4,342,733; 3,447,903; and U.S. Pat. No. 4,622,212.

SUMMARY OF THE INVENTION

The present invention provides a process for removing hydrogen sulfide from a fluid stream containing the same. Broadly, the process comprises the steps of reacting a portion of the hydrogen sulfide in the fluid stream with oxygen to form sulfur dioxide; absorbing the sulfur dioxide in a basic aqueous solution to form sulfites; and contacting the remaining portion of the hydrogen sulfide in the fluid stream with said sulfite solution to substantially remove said hydrogen sulfide and to obtain a thiosulfate.

In another aspect, the invention provides a continuous process for removing hydrogen sulfide from a fluid stream, comprising the steps of:

(a) contacting the hydrogen sulfide-containing stream with sulfites in aqueous solution essentially free of polyvalent metal chelate and peroxide to form thiosulfate in said solution and to obtain a partially treated stream of reduced hydrogen sulfide content;

(b) incinerating the partially treated stream to substantially convert the remaining hydrogen sulfide to sulfur dioxide;

(c) selectively absorbing the sulfur dioxide in an aqueous solution at conditions suitable for the formation of aqueous sulfites and for substantially avoiding the formation of precipitatable carbonates; and (d) supplying said aqueous sulfites from the absorption step to the contacting step.

In a further aspect, the invention provides a continuous process for the abatement of hydrogen sulfide in geothermal steam, including the steps of:

(a) condensing the geothermal steam with an aqueous solution of sulfites, essentially free of peroxides and polyvalent metal chelates, and containing a cationic polymeric catalyst to convert up to about one-third of the hydrogen sulfide to soluble thiosulfate and to obtain a non-condensable gas stream of reduced hydrogen sulfide content containing at least about two-thirds of the hydrogen sulfide;

(b) incinerating the non-condensable gas stream to substantially convert the hydrogen sulfide to sulfur dioxide;

(c) selectively absorbing the sulfur dioxide from the incinerated non-condensable gas stream in an aqueous alkaline solution to form sulfites for use in the condensation step, the absorption being at conditions effective to substantially avoid carbon dioxide absorption and formation of insoluble carbonates; and (d) supplying the sulfites from the absorption step to the condensation step.

BRIEF DESCRIPTION OF THE DRAWING

The accompanying Figure illustrates a process in which this invention is applied for the treatment of hydrogen sulfide contained in a liquid stream produced by the condensation of geothermal steam wherein the condensate is employed in a cooling tower and is used as the aqueous media for removal of the hydrogen sulfide.

In the Figure, geothermal steam from line 2 is used to power a steam turbine 4 which is connected to an electric power generator 6. Line 8 supplies steam and non-condensable gases from turbine 4 to a condenser 10, which may be a direct contact condenser, for example. Cooling water containing sulfites and catalyst from line 12 is sprayed into condenser 10 for this condensation and passes from the condenser 10 through line 14 to the well 16. Non-condensable gases such as $CO_2$, $H_2$, $CH_4$, $N_2$, $O_2$ and part of the $H_2S$ are removed from the main condenser 10 through line 18 to $SO_2$ generator or incinerator 20. An oxygen containing gas such as air, oxygen, or mixtures thereof is supplied to the incinerator 20 by line 21. The $SO_2$ incinerator 20 is a conventional catalytic incinerator, but a thermal incinerator may be used, if desired.

The $SO_2$ generated in the incinerator 20 is fed, along with the non-condensable gases and/or the combustion products thereof, by line 22 into an optional quench vessel 24 and thence by line 25 into a first stage scrubber 26. The $SO_2$ is partially absorbed from the gas stream in scrubber 26 by contact with scrubbing solution therein which is circulated by means of pump 28 and recirculation loop 30. The non-absorbed gases containing residual $SO_2$ are taken overhead from scrubber 26 in line 32 and fed to a second stage scrubber 34. Non-condensable and non-absorbable gases essentially free of $SO_2$ (less than 10 ppmv) are removed overhead from second stage scrubber 34 by line 44. Scrubbing solution is circulated through second stage scrubber 34 by means of pump 36 and recirculation loop 38. Makeup caustic solution is added to the second stage scrubber 34 by introduction via line 40 into recirculation loop 38. Scrubbing solution from second stage scrubber 34 is fed to first stage scrubber 26 from recirculation loop 38 through line 42 into recirculation loop 30. Spent scrubbing solution containing sulfite and bisulfite is fed from first stage scrubber 26 through line 46 from recirculation loop 30 into line 12 and thence to condensor 10 as previously described.

Condensate from well 16 is supplied to line 54 by pump 55 and thence to cooling tower 56. Cooled condensate is fed to well 57 by line 58 from cooling tower 56. Cooling tower overflow is removed by line 60. Condensate from the well 57 is supplied to line 12 via line 50 and pump 52. Makeup catalyst is added to line 12 by line 62.

DETAILED DESCRIPTION OF THE INVENTION

The present process can be used to treat a wide variety of fluid streams containing hydrogen sulfide, for example, sour gas streams such as natural gas, refinery gas, synthesis gas, or the like. The process of the present invention has particular application to the treatment of hydrogen sulfide-containing streams where it is necessary or desirable to avoid the formation of solid sulfur and other solid precipitates, such as in the hydrogen sulfide abatement in geothermal steam used for power generation.

In the first step of the process, the fluid stream to be treated is contacted with aqueous sulfites which react with the hydrogen sulfide to form thiosulfates or other soluble sulfur species. The solution of aqueous sulfites need not contain polyvalent metal chelate or peroxide which are used in many prior art processes for hydrogen sulfide abatement, and is preferably essentially free of such chelates and peroxides. The contacting step is also preferably carried out at conditions effective to substantially avoid the formation of precipitates such as elemental sulfur, sulfates, carbonates and the like, which, if formed in appreciable quantities, can foul and plug the processing equipment, particularly cooling towers which are commonly used to cool geothermal steam condensate formed in the contacting step. The temperature of the sulfite solution should be maintained in the range from 0° to 95° C. in the contacting step.

In the second step of the process, the fluid stream of reduced hydrogen sulfide content from the contacting step, e.g., non-condensable gases in the case of geothermal steam treatment, is incinerated to substantially convert the remaining hydrogen sulfide therein to sulfur dioxide.

In the third step of the process, the $SO_2$ generated by the incinerating step is absorbed in a scrubbing solution to obtain thiosulfates. The absorption is in an alkaline solution to substantially remove the $SO_2$, but is preferably carried out at conditions to selectively absorb the $SO_2$ away from any $CO_2$ which may be present in the incinerator effluent. This is most advantageously effected in a countercurrent two-step scrubber. The raw incinerator effluent is fed through the first stage scrubber and then through the second stage scrubber before release to the atmosphere to substantially remove $SO_2$, e.g. to less than 10 ppmv and especially to less than 1 ppmv. The first stage scrubber is operated at a lower pH relative to that of the second stage scrubber, preferably in the range of 4-7, more preferably 4-5, and especially about 4.5. The second stage scrubber is operated at an alkaline pH, preferably in the range of 8.5-9.5, and especially about 9. Makeup alkali metal hydroxide or ammonium hydroxide is added to the second stage scrubber to maintain the proper pH. Where carbon dioxide is present in the incineration effluent, however, the makeup alkaline solution must be added in such a manner that contact between the carbon dioxide and free alkali metal or ammonium is substantially avoided to inhibit carbon dioxide absorption and the concomitant formation of precipitatable carbonates. This is effected, for example, by introducing the hydroxide in solution to the second-stage scrubbing liquor in a recirculation loop with sufficient residence time to react the alkali metal or ammonium with sulfurous acid and/or bisulfite to form bisulfite and/or sulfite before any contact of $CO_2$ gas therewith. The second-stage scrubbing liquor is fed counter-currently to the first stage scrubbing liquor, preferably mixed therewith in a recirculation loop associated with the first-stage scrubber. Scrubbing liquor withdrawn from the first stage scrubber is used as the source of sulfites for the hydrogen sulfide contacting step.

A key feature of the present invention is that hydrogen sulfide in a fluid stream containing the same is reacted with sulfite and/or bisulfite (collectively referred to herein as "sulfites") by combustion of a portion of the $H_2S$ from the fluid stream and subsequently absorbing the $SO_2$ resulting from the combustion in a basic aqueous solution to form the sulfites with which the remainder of the hydrogen sulfide is reacted to form soluble thiosulfate. It is important to divert at least a stoichiometric proportion of the hydrogen sulfide for sulfur dioxide generation and sulfite/bisulfite formation so that stiochiometric or excess sulfites are available to react with the remainder of the hydrogen sulfide to form soluble, higher oxidation state sulfur species such as thiosulfate, according the following equation:

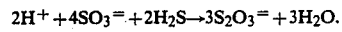
$$2H^+ + 4SO_3^= + 2H_2S \rightarrow 3S_2O_3^= + 3H_2O.$$

In the present process, the sulfites can function as the sole oxidizing agent so that polyvalent metal chelates and peroxides employed in the processes of the prior art are not required. Thus, according to the stoichiometry of the above equation, at least about two volumes of $H_2S$ are diverted for $SO_2$ generation and sulfite/bisulfite formation per one volume of $H_2S$ which is absorbed in the sulfite/bisulfite solution used to contact the $H_2S$ to form soluble thiosulfate species. By carefully controlling the partition of two-thirds of the hydrogen sulfide for conversion to sulfur dioxide, and also by carefully controlling the sulfites formed to approximately 50% sulfite and 50% bisulfite, the hydrogen sulfide can be converted entirely to soluble thiosulfates without the need for makeup sulfites or other reagents (other than the polymeric catalysts discussed below).

It is desirable in the contact of the hydrogen sulfide and the sulfites to assure that the conversion of hydrogen sulfide to thiosulfate is substantially completed in appropriate reactor residence time by employing a suitable catalyst, such as, for example, cationic polymeric catalysts, preferably quaternary amine catalysts having a molecular weight of at least about 10,000. Representative examples of such cationic polymeric catalysts include the quaternary polyethyleyneamines, poly(2-hydroxypropyl-1-N-methylammonium chloride), poly(2-hydroxypropyl-1,1-N-dimethylammonium chloride), poly[N-(dimethyl-aminomethyl)]-acrylamide, poly(2-vinylimidazolinium bisulfate), poly(diallyldimethyl ammonium chloride), polyepiamine and poly(N-dimethyl aminopropyl)-methacrylamide. These cationic polymers are well known and are commercially available under various tradenames. See, for example, *Commercial Orqanic Flocculants* by J. Vostrcil et al, Noyes Data Corp. 1972 which in incorporated by reference herein. Other useful cationic polymeric catalysts are set forth in *J. Macromol. Science-Chem. A*4, pages 1327–1417 (1970) which is also incorporated by reference herein. Polyepiamine is comercially available under the trade designation Exxon Jayfloc, e.g. Jayfloc 835. The foregoing catalysts are used in the sulfite/bisulfite solution at a rate in the range from 25 to 3000 parts per million. A preferred range is 50 to 500 parts per million, and the most preferred range is 50 to 300 parts per million. It is to be understood that these ranges are considered to be effective amounts of the catalysts, and that the use of amounts less than these ranges do not generally have the desired effect, while the use of amounts more than these are not generally economical.

The process described here is illustrative and explanatory of the invention, and various modifications of the reactants, reagents, pressures, temperatures, residence times and other like process variables and the equipment will occur to those skilled in the art in view of the foregoing. It is intended that all such modifications within the scope and spirit of the appended claims be embraced thereby.

What is claimed is:

1. A continuous process for abating hydrogen sulfide in geothermal steam, comprising the steps of:
    condensing the geothermal steam with an aqueous solution of sulfites, essentially free of peroxide and polyvalent metal chelate, and containing a cationic polymeric catalyst to convert up to about one-third of the hydrogen sulfide to soluble thiosulfate and to obtain a non-condensable gas stream of reduced hydrogen sulfide content containing at least about two-thirds of the hydrogen sulfide;
    incinerating the non-condensable gas stream to substantially convert said hydrogen sulfide to sulfur dioxide;
    selectively absorbing the sulfur dioxide from said incinerated non-condensable gas stream in an aqueous alkaline solution to form sulfites for said condensation step, said absorption being at conditions effective to substantially avoid carbon dioxide absorption and formation of insoluble carbonates; and
    supplying said sulfites from said absorption step to said condensation step.

2. The process of claim 1, wherein said condensation step produces an aqueous thiosulfate solution essentially free of sulfites.

3. The process of claim 2, wherein said thiosulfate solution is cooled and recirculated to said condensation step with said sulfites.

4. The process of claim 3, wherein said condensation step is at conditions effective to avoid carbonate precipitation in said cooled thiosulfate solution.

5. The process of claim 1, wherein said catalyst is soluble and has a molecular weight of at least about 10,000.

6. The process of claim 5, wherein said catalyst is selected from the group consisting of: quaternary polyethyleneamines, poly(2-hydroxypropyl-1-N-methylammonium chloride), poly(2-hydroxypropyl-1,1-N-dimethylammonium chloride), poly[N-(dimethylaminomethyl)]-acrylamide, poly(2-vinylimidazolinium bisulfate), poly(diallyldimethyl ammonium chloride), polyepiamine and poly(N-dimethyl aminopropyl)methacrylamide.

7. The process of claim 5, wherein said catalyst comprises poly(dimethyldiallyl ammonium chloride).

8. The process of claim 1, wherein said sulfur dioxide absorption is effected in a two-stage countercurrent scrubber.

9. The process of claim 8, wherein the first stage of said scrubber includes recirculating scrubbing liquor at a pH of about 4–7.

10. The process of claim 9, wherein said pH is about 4–5.

11. The process of claim 9, wherein the second stage of said scrubber includes recirculating scrubbing liquor at a pH of about 8.5–9.5.

12. The process of claim 11, wherein makeup alkali metal hydroxide or ammonium hydroxide is added to said recirculating scrubbing liquor to convert said hydroxide to sulfites prior to absorption of sulfur dioxide thereby to substantially avoid carbonate absorption.

13. The process of claim 12, wherein a portion of said first stage scrubbing liquor is supplied to said condensation, step and a portion of said second stage scrubbing liquor is supplied to said first stage.

* * * * *